(No Model.)
B. F. PHILBROOK.
DENTAL TOOL.
No. 533,738. Patented Feb. 5, 1895.
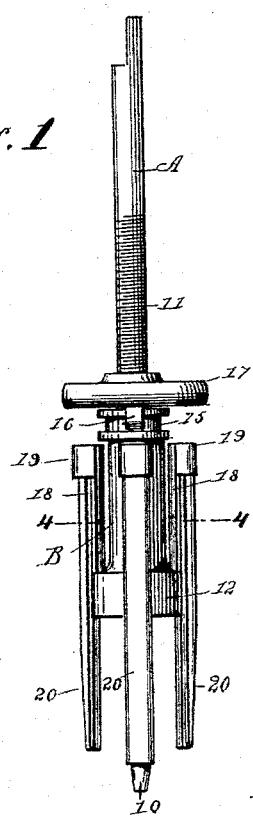
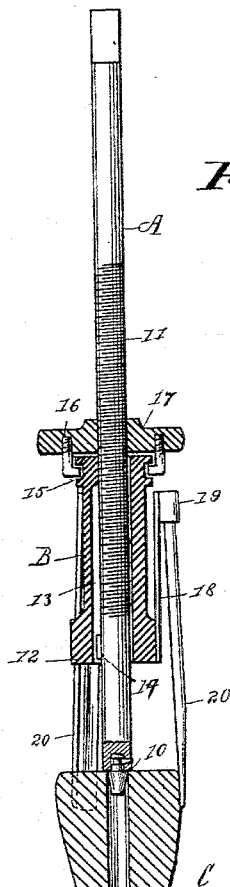
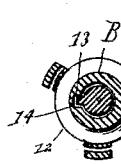
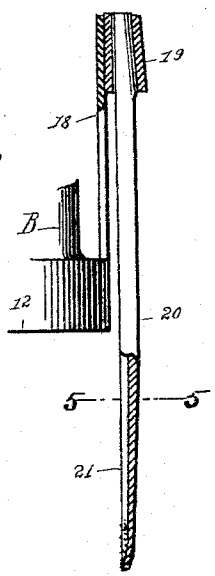
WITNESSES:
John Bergstrom
Fred Acker
INVENTOR
B. F. Philbrook
BY Munn & Co
ATTORNEYS.

UNITED STATES PATENT OFFICE.

BARNABAS F. PHILBROOK, OF DUNLAP, IOWA.

DENTAL TOOL.

SPECIFICATION forming part of Letters Patent No. 533,738, dated February 5, 1895.

Application filed July 31, 1894. Serial No. 519,055. (No model.)

*To all whom it may concern:*

Be it known that I, BARNABAS F. PHILBROOK, of Dunlap, in the county of Harrison and State of Iowa, have invented a new and Improved Dental Tool, of which the following is a full, clear, and exact description.

My invention relates to an improvement in dental tools, especially adapted for reducing a root to receive a cap, crown, or bridge, the tool being also adapted for use in connection with dental engines, hand pieces, and right angled attachments.

The object of the invention is to provide a tool of the above character which will be simple, durable and economic in its construction, and while in use will touch different portions of the root at the same time, providing multiple cutting surfaces, the said multiple cutting surfaces serving to render the tool steady in its action, causing it to cut smoothly, expeditiously, and without trembling or jumping.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a side elevation of the tool. Fig. 2 is a longitudinal section through the tool, illustrating its application to the root. Fig. 3 is an enlarged sectional view of one of the cutting instruments, illustrating the manner of its attachment. Fig. 4 is a transverse section, taken substantially on the line 4—4 of Fig. 1; and Fig. 5 is a transverse section through the cutting instrument, taken essentially on the line 5—5 of Fig. 3.

In carrying out the invention a mandrel A is employed, provided with a pivoted point 10 at one end, adapted to enter the nerve seat of a tooth, while the opposite end of the mandrel is fitted for attachment to a dental engine, hand piece, or what is known as a right-angled attachment, and the said mandrel is further provided with an exterior thread 11 between its ends.

The hub or tool carrier B, is held to slide loosely upon the said mandrel, the lower portion of the hub or tool carrier being enlarged in diameter to form a head 12; and the said hub or tool carrier is provided with a longitudinal groove 13 in its inner wall, receiving a feather 14 upon the mandrel, whereby the hub or tool carrier while free to slide upon the mandrel is compelled to revolve with it.

The upper end of the hub or tool carrier has an annular groove 15 produced therein, which receives fixed pawls 16, fast to a milled nut 17, threaded to correspond to the thread of the mandrel, whereby through the rotation of the said nut the hub or tool carrier may be moved endwise upon the mandrel.

Two or more, ordinarily four, springs 18, are secured at one of their ends upon the exterior of the head 12 of the tool carrier, and these springs extend lengthwise longitudinally of the carrier, being free from engagement therewith above their point of attachment. Each spring at its free end is provided with a socket 19 of any approved shape, and each socket is adapted to receive a cutting instrument or tool 20, the said tools being of such length that they extend in direction of the pivoted end of the mandrel a predetermined distance beyond the corresponding end of the tool carrier. The tools 20, are adapted to reduce the root C to be ground or otherwise treated, and engage with the peripheral surface of the root at the top. The said cutting tools are constructed of copper or aluminum, and are provided with small diamonds, or diamond dust, driven into their inner surface at their working ends; and the tools upon their inner faces are longitudinally grooved, as illustrated at 21 in Figs. 3 and 5, in order that they may be made to retain corundum or emery as a cutting agent.

It will be observed that the tendency of the springs 18 is to constantly draw the working ends of the cutting tools toward the mandrel, and therefore when said tools are carried outward to engage with the periphery of a root they are held by the springs constantly in such engagement; and it is further evident that while the cutting tools follow the outlines of the root, the surface of the root worked upon is reduced without changing its contour, simply reversing its taper.

The tool holder being adjustable upon the mandrel and controlled by the milled nut, the cut can be increased or lessened at will; and the fact that the tools are made of copper or aluminum admits of their being bent into the desired shape to fit the case in hand. Consequently, one size of hub or tool carrier is well adapted to reduce any of the human teeth or roots for crown or bridge work.

The tools are also interchangeable, so that any desired length may be used; and when the tools are dulled, or worn out, they may be readily replaced by others.

I desire it understood that the tool carrier may be adjustably mounted upon the mandrel otherwise than shown.

Having thus described my invention, I claim as new and desire to secure by Letters Patent—

1. A tool for reducing teeth and roots, the same consisting of a mandrel, a tool carrier adjustable upon the mandrel and rotating therewith, and spring-controlled cutting tools connected with the said carrier, as and for the purpose specified.

2. A tool for reducing teeth, comprising a mandrel, a tool holder thereon and rotating therewith, and an annularly arranged series of longitudinally extending tools connected at their upper ends with said holder and provided on the inner faces of their lower ends with cutting or abrading surfaces, substantially as described.

3. A tool for dental instruments of the character set forth consisting in a shank or stem having a longitudinal groove or socket on the inner side of its lower portion to receive an abrading material, substantially as described.

4. In a dental tool for reducing teeth, a support, a tool carrier adjustable upon and rotating with the support, springs attached to the said carrier and provided with sockets, and cutting tools fitted in said sockets, the said tools being of a shapable material and adapted for engagement with the exterior of a tooth or root, as and for the purpose specified.

5. A dental tool comprising a mandrel threaded between its ends and having a point at its lower end to enter the nerve seat and center the tool, a holder sliding on and turning with the mandrel and having an adjusting nut working on the threaded portion of the mandrel, a series of spring arms secured at their lower ends to the holder and provided at their upper ends with sockets, and a series of tools secured at their upper ends in the said sockets and extending downward to engage the exterior of the tooth with the inner faces of their lower ends, substantially as described.

BARNABAS F. PHILBROOK.

Witnesses:
E. F. DEARDURFF,
F. W. CURTIS.